(12) United States Patent
Stahulak et al.

(10) Patent No.: US 10,200,742 B2
(45) Date of Patent: *Feb. 5, 2019

(54) SYSTEM AND METHOD OF DISPLAYING CONTENT

(71) Applicant: AT&T INTELLECTUAL PROPERTY I, L.P., Atlanta, GA (US)

(72) Inventors: Charles Stahulak, Chicago, IL (US); Bruce Barnes, Crystal Lake, IL (US); Dolores J. Mallian, St. Charles, IL (US); Nikhil Marathe, Roselle, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/804,836

(22) Filed: Jul. 21, 2015

(65) Prior Publication Data

US 2015/0326929 A1 Nov. 12, 2015

Related U.S. Application Data

(63) Continuation of application No. 14/540,890, filed on Nov. 13, 2014, now Pat. No. 9,118,956, which is a
(Continued)

(51) Int. Cl.
*H04N 5/44* (2011.01)
*H04N 21/431* (2011.01)
(Continued)

(52) U.S. Cl.
CPC ........... *H04N 21/431* (2013.01); *H04N 5/445* (2013.01); *H04N 5/44543* (2013.01); *H04N 21/4221* (2013.01); *H04N 21/42692* (2013.01); *H04N 21/4345* (2013.01); *H04N 21/4383* (2013.01); *H04N 21/4384* (2013.01);
(Continued)

(58) Field of Classification Search
CPC ............. H04N 21/431; H04N 21/4384; H04N 21/4825; H04N 21/4345; H04N 21/42692; H04N 21/4383; H04N 21/44222; H04N 21/482; H04N 21/4823; H04N 21/472; H04N 5/44543; H04N 5/445
USPC ....... 348/734, 474, 473, 487, 725, 720, 731, 348/732, 552–554, 563–565, 569–570; 725/725, 720, 731, 732, 38, 39, 37, 40,
(Continued)

(56) References Cited

U.S. PATENT DOCUMENTS 5,737,028 A 4/1998 Bertram et al.
5,926,207 A * 7/1999 Vaughan ............. H04N 5/4401
348/552

(Continued)

OTHER PUBLICATIONS

"ActiveVideo CloudTV GuideCast: Delivering User Interfaces From the Cloud," ActiveVideo Networks, Inc., 2014, pp. 1-2.
(Continued)

*Primary Examiner* — Paulos M Natnael
(74) *Attorney, Agent, or Firm* — Toler Law Group, PC

(57) ABSTRACT

A method includes receiving, at a computing device, input indicating a request to view a list. The list includes multiple elements, each of the elements corresponding to respective video content. The method also includes sending the list to a display device in response to the request, where the elements of the list are ordered based on a display order of the respective video content.

20 Claims, 4 Drawing Sheets

Related U.S. Application Data continuation of application No. 14/181,038, filed on Feb. 14, 2014, now Pat. No. 8,913,199, which is a continuation of application No. 11/788,390, filed on Apr. 19, 2007, now Pat. No. 8,687,128.

(51) Int. Cl.

| | |
|---|---|
| H04N 21/438 | (2011.01) |
| H04N 21/482 | (2011.01) |
| H04N 5/445 | (2011.01) |
| H04N 21/434 | (2011.01) |
| H04N 21/422 | (2011.01) |
| H04N 21/426 | (2011.01) |
| H04N 21/442 | (2011.01) |
| H04N 21/472 | (2011.01) |

(52) U.S. Cl.
CPC ..... *H04N 21/44222* (2013.01); *H04N 21/472* (2013.01); *H04N 21/482* (2013.01); *H04N 21/4823* (2013.01); *H04N 21/4825* (2013.01)

(58) Field of Classification Search
USPC ...... 725/46, 52, 54, 57, 43, 47, 56, 61, 142, 725/10
See application file for complete search history.

(56) References Cited

U.S. PATENT DOCUMENTS

| | | | |
|---|---|---|---|
| 5,943,467 A | 8/1999 | Beyers et al. | |
| 5,986,650 A * | 11/1999 | Ellis | H04N 5/44543 348/563 |
| 6,037,877 A | 3/2000 | Matthews | |
| 6,072,535 A * | 6/2000 | Kearns | H04N 5/44543 348/114 |
| 6,084,644 A | 7/2000 | Atkinson | |
| 6,094,239 A | 7/2000 | Weber | |
| 6,141,003 A * | 10/2000 | Chor | H04N 5/44543 348/E5.104 |
| 6,185,423 B1 * | 2/2001 | Brown | H04W 36/06 455/434 |
| 6,262,780 B1 | 7/2001 | Ho et al. | |
| 6,396,549 B1 | 5/2002 | Weber | |
| 6,438,752 B1 | 8/2002 | McClard | |
| 6,493,038 B1 | 12/2002 | Singh et al. | |
| 6,530,083 B1 * | 3/2003 | Liebenow | H04N 7/163 348/E7.061 |
| 6,573,854 B1 | 6/2003 | Hug et al. | |
| 6,681,396 B1 * | 1/2004 | Bates | H04N 5/782 386/E5.043 |
| 6,817,027 B1 * | 11/2004 | Curreri | H04N 21/482 348/E5.105 |
| 6,839,903 B1 * | 1/2005 | Shintani | H04N 5/44543 345/699 |
| 7,030,933 B2 | 4/2006 | Takagi et al. | |
| 7,061,549 B1 | 6/2006 | Mabon | |
| 7,170,420 B2 * | 1/2007 | Phifer | G08C 23/04 340/12.55 |
| 7,532,253 B1 | 5/2009 | Greenberg | |
| 8,332,888 B2 * | 12/2012 | Chen | H04N 5/44591 725/37 |
| 8,724,025 B2 | 5/2014 | Park et al. | |
| 2002/0052864 A1 * | 5/2002 | Yamamoto | G06F 17/3061 |
| 2002/0057893 A1 * | 5/2002 | Wood | H04N 5/4401 386/355 |
| 2002/0075408 A1 * | 6/2002 | Curreri | H04N 5/50 348/569 |
| 2002/0078457 A1 * | 6/2002 | Nishikawa | H04N 5/44543 725/61 |
| 2002/0162121 A1 | 10/2002 | Mitchell | |
| 2003/0056216 A1 * | 3/2003 | Wugofski | H04N 5/44543 725/46 |
| 2003/0095048 A1 * | 5/2003 | Choi | G06F 3/0238 340/12.51 |
| 2003/0115589 A1 * | 6/2003 | D'Souza | H04H 60/43 725/10 |
| 2003/0149675 A1 * | 8/2003 | Ansari | A63F 13/10 706/2 |
| 2003/0179320 A1 * | 9/2003 | Kim | H04N 5/44543 348/732 |
| 2004/0003399 A1 | 1/2004 | Cooper | |
| 2004/0025179 A1 * | 2/2004 | Russ | H04N 5/44543 725/46 |
| 2004/0034866 A1 * | 2/2004 | Yuen | G11B 23/042 725/40 |
| 2004/0080672 A1 * | 4/2004 | Kessler | H04N 5/4401 348/553 |
| 2004/0135929 A1 * | 7/2004 | Hoda | H04N 5/50 348/732 |
| 2004/0172651 A1 * | 9/2004 | Wasilewski | H04N 5/44543 725/46 |
| 2004/0194135 A1 | 9/2004 | Kahn | |
| 2005/0015803 A1 * | 1/2005 | Macrae | H04N 5/44543 725/41 |
| 2005/0058433 A1 | 3/2005 | Young | |
| 2005/0125743 A1 | 6/2005 | Beaton et al. | |
| 2005/0251828 A1 | 11/2005 | Young et al. | |
| 2006/0015903 A1 * | 1/2006 | MacBeth | H04N 5/44543 725/46 |
| 2006/0158570 A1 * | 7/2006 | Arora | H04N 21/4383 348/731 |
| 2007/0009229 A1 * | 1/2007 | Liu | H04N 5/44513 386/230 |
| 2007/0079330 A1 | 4/2007 | Ludvig et al. | |
| 2007/0107037 A1 * | 5/2007 | Walter | H04N 5/44543 725/135 |
| 2007/0124765 A1 | 5/2007 | Bennett et al. | |
| 2007/0124770 A1 * | 5/2007 | Guillorit | H04N 5/4403 725/56 |
| 2007/0127887 A1 | 6/2007 | Yap et al. | |
| 2007/0143790 A1 * | 6/2007 | Williams | H04N 5/44543 725/38 |
| 2007/0192791 A1 * | 8/2007 | Sullivan | H04N 5/50 725/38 |
| 2007/0204320 A1 | 8/2007 | Wu et al. | |
| 2008/0010270 A1 | 1/2008 | Gross | |
| 2008/0060027 A1 | 3/2008 | Yang | |
| 2008/0109557 A1 * | 5/2008 | Joshi | H04L 47/10 709/231 |
| 2008/0259220 A1 | 10/2008 | Stahulak et al. | |
| 2008/0313675 A1 * | 12/2008 | Dunton | H04N 5/44543 725/46 |
| 2009/0116379 A1 * | 5/2009 | Rahman | H04N 21/2402 370/229 |
| 2009/0222757 A1 * | 9/2009 | Gupta | H04N 5/44543 715/776 |
| 2009/0228943 A1 | 9/2009 | Ramaswamy et al. | |
| 2010/0037267 A1 * | 2/2010 | Bennett | H04N 7/165 725/56 |
| 2010/0071004 A1 | 3/2010 | Wightman | |
| 2010/0083310 A1 | 4/2010 | VanDuyn et al. | |
| 2010/0154005 A1 * | 6/2010 | Baxter | G06F 17/30038 725/56 |
| 2010/0157166 A1 * | 6/2010 | Kendall | G06F 3/0338 348/734 |
| 2010/0175089 A1 * | 7/2010 | Seo | H04N 5/44543 725/44 |
| 2011/0078743 A1 * | 3/2011 | Kim | H04N 5/44543 725/56 |
| 2011/0205435 A1 * | 8/2011 | Lee | H04N 5/44543 348/563 |
| 2012/0174163 A1 * | 7/2012 | Moorthy | H04N 21/4227 725/56 |
| 2012/0233640 A1 * | 9/2012 | Odryna | H04N 21/4622 725/45 |
| 2012/0235895 A1 * | 9/2012 | Kambe | H04N 21/4384 345/156 |
| 2012/0284763 A1 * | 11/2012 | Choi | H04N 21/44209 725/110 |

(56) References Cited

U.S. PATENT DOCUMENTS

| | | | |
|---|---|---|---|
| 2013/0176415 A1* | 7/2013 | Kim | H04N 5/23219 |
| | | | 348/78 |
| 2014/0109143 A1* | 4/2014 | Craner | H04N 21/4826 |
| | | | 725/46 |
| 2014/0165109 A1* | 6/2014 | Stahulak | H04N 5/44543 |
| | | | 725/56 |
| 2015/0189688 A1* | 7/2015 | Joslyn | H04W 16/12 |
| | | | 455/73 |

OTHER PUBLICATIONS

"Your new Verizon FiOS TV remote control," VEFIFF60142-12/06, Nov. 21, 2006, Verizon Communications, New York, New York, pp. 1-17.

* cited by examiner

SYSTEM AND METHOD OF DISPLAYING CONTENT

CROSS-REFERENCE TO RELATED APPLICATIONS

The present application is a continuation of, and claims priority to, U.S. patent application Ser. No. 14/540,890, filed on Nov. 13, 2014 and entitled "SYSTEM AND METHOD OF DISPLAYING CONTENT," now issued as U.S. Pat. No. 9,118,956, which is a continuation of U.S. patent application Ser. No. 14/181,038, filed on Feb. 14, 2014 and entitled "SYSTEM AND METHOD OF DISPLAYING CONTENT," now issued as U.S. Pat. No. 8,913,199, which is a continuation of U.S. patent application Ser. No. 11/788,390, filed on Apr. 19, 2007 and entitled "SYSTEM AND METHOD OF NAVIGATING PREVIOUSLY VIEWED CHANNELS," now issued as U.S. Pat. No. 8,687,128, the contents of each of which is incorporated herein by reference in its entirety.

FIELD OF THE DISCLOSURE

The present disclosure is generally related to a system and method of displaying content.

BACKGROUND

Last channel selection keys on remote controls have become increasingly popular with the expansion of available television services. Unfortunately, remote controls and video tuning devices may limit users to navigate to only a single previously viewed channel by pressing a last channel selection key. Hence, there is a need for an improved system and method of navigating previously viewed channels.

DETAILED DESCRIPTION

The disclosure is directed to systems and methods of navigating previously viewed channels. In a particular embodiment, a method may include maintaining a channel list in a memory where the channel list includes multiple previously viewed channels. The method may also include receiving a first signal to select a first selected channel in the channel list. The method may also include tuning a channel tuner to the first selected channel.

In another particular embodiment, a device may include a user interface, a memory, a channel tuner, and processing logic, where the user interface, the memory, and the channel tuner are accessible to the processing logic. The memory may include instructions to cause the processing logic to execute a method. The method may include maintaining a channel list in the memory. The channel list may include multiple previously viewed channels. The method may also include receiving a first signal via the user interface to select a first selected channel in the channel list. The method may also include tuning the channel tuner to the first selected channel.

In yet another particular embodiment, a remote control device may include a first user selectable selection key to navigate a channel list. The channel list may include multiple previously viewed channels. The remote control device may also include a second user selectable selection key to navigate the channel list.

In still yet another particular embodiment, a computer readable medium may have instructions to cause processing logic to execute a method. The method may include maintaining a channel list in a memory. The channel list may include multiple previously viewed channels. The method may also include sending the channel list to a display device to be displayed in a graphical user interface (GUI). The GUI may include a user selectable element for each channel in the channel list. The method may also include receiving a first signal to select a first selected channel in the channel list. The method may also include tuning a channel tuner to the first selected channel.

Figure 1:
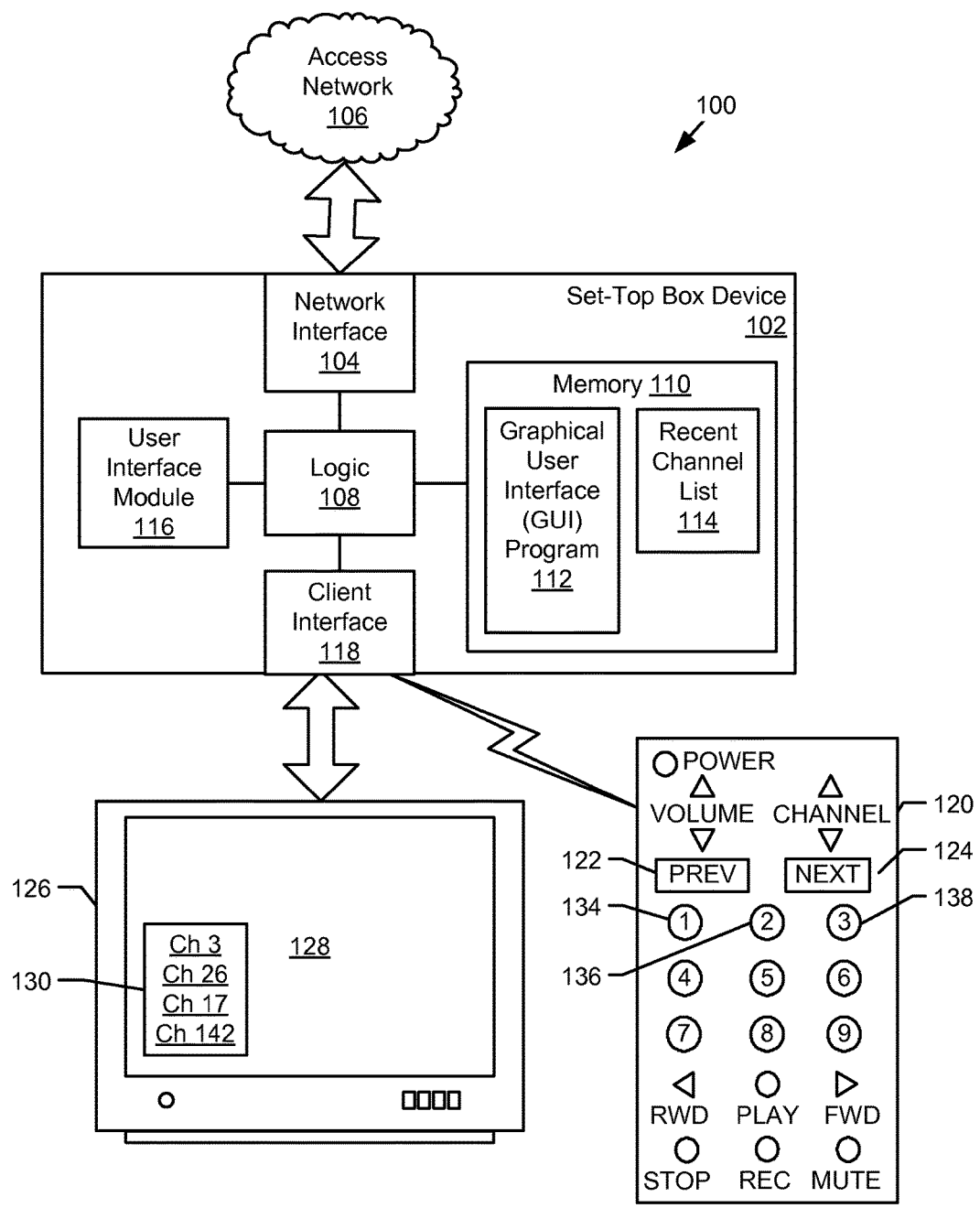
FIG. 1 is a block diagram of a particular illustrative embodiment of a system to navigate previously viewed channels.

Referring to FIG. 1, a particular embodiment of a system to navigate previous channels is illustrated and generally designated 100. The system 100 includes a user device 102, such as a set-top box device, communicating with an access network 106 of a television content distribution system, such as an Internet Protocol Television (IPTV) system, a cable television system, or a satellite television system. The user device 102 may be coupled to or integrated with a display device 126 having a viewing area 128, such as a television monitor. The user device 102 may include a set-top box device; a video cassette recording (VCR) device; a digital versatile disc (DVD) device; a digital video recorder (DVR); a video gaming device or a console that is adapted to receive television content; an interface device within the display device 128, such as a cable card; a personal computer or other computing device that is adapted to receive television content; any other device adapted to receive television content via the access network 106; or any combination thereof.

The user device 102 includes logic 108 and memory 110 accessible to the logic 108. In a particular embodiment, the logic 108 may be a processor or controller. The logic 108 can be coupled to a network interface 104 that facilitates communication between the user device 102 and the access network 106.

Further, the user device 102 can communicate with a display device 126 and a remote control device 120 via a client interface 118. The remote control device 120 can include a previous channel selection key 122. The previous channel selection key 122 may be labeled back, last, previous, or another similar identifier. The remote control device 120 may also include a next channel selection key 124. The next channel selection key 124 may be labeled forward, next, or another similar identifier.

In a particular embodiment, the memory 110 may include instructions 112 executable by the logic 108 to provide a graphical user interface (GUI) to navigate television content at the display device 126. In an illustrative embodiment, the instructions 112 can be a portion of a GUI software application or other computer program stored at the memory 110. The memory 110 may also include instructions 114 executable by the logic 108 to store a recent channel list. The recent channel list may store multiple previously viewed channels in an order that they were viewed with respect to time. In a particular embodiment, the instructions 114 may include instructions executable by the logic 108 to provide a user selectable channel list 130 to be displayed in the viewing area 128. In another particular embodiment, the instructions 114 include instructions to allow a user to select a number of recent channels to be stored in the recent channel list and/or displayed in the user selectable channel list 130.

The user device 102 may receive user input from the remote control device 120 and process the user input via a user interface module 116. In response to the user input, the logic 108 may select a recent channel from the recent channel list to be displayed at the display device 126. In an illustrative embodiment, the user may navigate to a previous channel from the recent channel list by depressing the previous channel selection key 122. The user may navigate to a second previous channel by depressing the previous channel selection key 122 twice. The user may navigate to a next channel in the recent channel list by depressing a next channel selection key 124. The user may navigate to a second next channel in the recent channel list by depressing the next channel selection key 124 twice. The user may navigate backwards or forwards in the recent channel list by pressing either the previous channel selection key 122 or the next channel selection key 124 once or multiple times depending on the desired previous channel and a respective channel location in the channel list.

In a particular embodiment, the user may navigate to a channel in the recent channel list by selecting at least one selectable element of the user selectable channel list 130 using the remote control device 120. In an illustrative embodiment, the user may select a channel in the user selectable channel list 130 by navigating a selection mechanism, such as a highlight mechanism, on the screen until the desired channel is selected, and confirming the selection.

In another illustrative embodiment, the user may select the desired channel by entering a value on a keypad of the remote control device 120. For example, once the user selectable channel list 130 is displayed in the viewing area 128, the user may press a first selection key, such as a selection key 134 labeled "1", to select a first channel shown in the user selectable channel list 130. Further, the user may select a second channel shown in the user selectable channel list 130 by depressing a second selection key, such as a selection key 136 labeled "2". Even further, the user may select a third channel shown in the user selectable channel list 130 by depressing a third selection key, such as a selection key 138 labeled "3". In a particular embodiment, each channel in the user selectable channel list 130 can be associated with a specific selection key, or combination of selection keys, to allow a user to select a respective channel.

Figure 2:
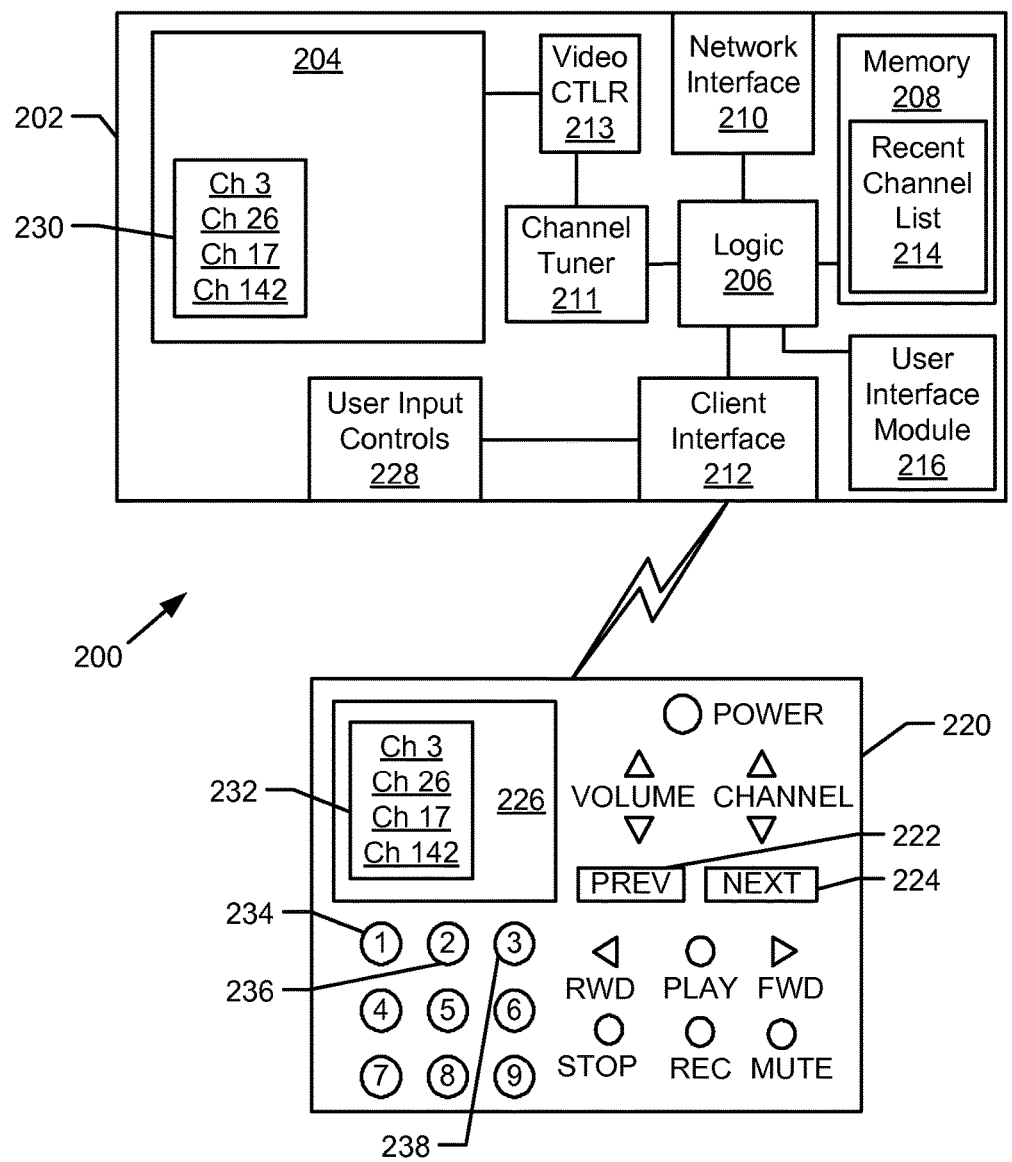
FIG. 2 is a block diagram of a second particular illustrative embodiment of a system to navigate previously viewed channels.

Referring to FIG. 2, a particular embodiment of a system to navigate previously viewed channels is illustrated and generally designated 200. The system 200 includes a user device 202, such as a television, that can receive television content. The user device 202 includes a viewing area 204, such as a television monitor. Also, the user device 202 includes logic 206 and memory 208 accessible to the logic 208. In a particular embodiment, the logic 208 may be a processor or controller. The logic 208 can be coupled to a network interface 210 that facilitates communication between the user device 202 and a television content delivery system. The logic 208 can be coupled to a channel tuner 211 to tune a signal received via the network interface 210 to a specific channel. The channel tuner 211 can provide the specific channel to a video controller 213 for display at the viewing area 204.

Further, the user device 202 can communicate with a remote control device 220 and user input controls 228 via a client interface 212. The remote control device 220 can include a previous channel selection key 222. The remote control device 220 may also include a next channel selection key 224. The remote control device 220 may also include a display 226 to display a recent channel list 232 and allow for the selection of a channel from the recent channel list 232.

In a particular embodiment, the memory 208 may include instructions 214, executable by the logic 206 to store a recent channel list. In a particular embodiment, the instructions 214 may include instructions executable by the logic 206 to provide a user selectable channel list 230 to be displayed in the viewing area 204. In another particular embodiment, the instructions 214 include instructions to allow a user to select a number of recent channels to be stored in the recent channel list and/or displayed in the user selectable channel list 230.

The user device 202 may receive user input from the remote control device 220 and process the user input via a user interface module 216. In response to the user input, the logic 206 may select a channel from the recent channel list to be displayed at the display device 202. In an illustrative embodiment, the user may navigate to a previous channel from the recent channel list by depressing the previous channel selection key 222. The user may navigate to a second previous channel by depressing the previous channel selection key 222 twice. The user may navigate to a next channel in the recent channel list by depressing a next channel selection key 224. The user may navigate to another next channel in the recent channel list by depressing the next channel selection key 224 twice. The user may navigate backwards or forwards in the recent channel list by pressing either the previous channel selection key 222 or the next channel selection key 224 once or multiple times depending on the desired previous channel and a respective channel location in the channel list.

In a particular embodiment, the user may navigate to a channel in the recent channel list by selecting at least one selectable element of the user selectable channel list 230 using the remote control device 220 or the user input controls 228. In an illustrative embodiment, the user may select a channel in the user selectable channel list 230 by navigating a selection mechanism, such as a highlight mechanism, on the screen until the desired channel is selected, and confirming the selection.

In another particular embodiment, the user may select the desired channel by entering a value on a keypad of the remote control device 220. For example, once the user selectable channel list 230 is displayed in the viewing area 204, the user may press a first selection key, such as a selection key 234 labeled "1", to select a first channel shown in the user selectable channel list 230. Further, the user may select a second channel shown in the user selectable channel list 230 by depressing a second selection key, such as a selection key 236 labeled "2". Even further, the user may select a third channel shown in the user selectable channel list 230 by depressing a third selection key, such as a selection key 238 labeled "3". In a particular embodiment, each channel in the user selectable channel list 230 can be associated with a specific selection key, or combination of selection keys, to allow a user to select a respective channel.

Figure 3:
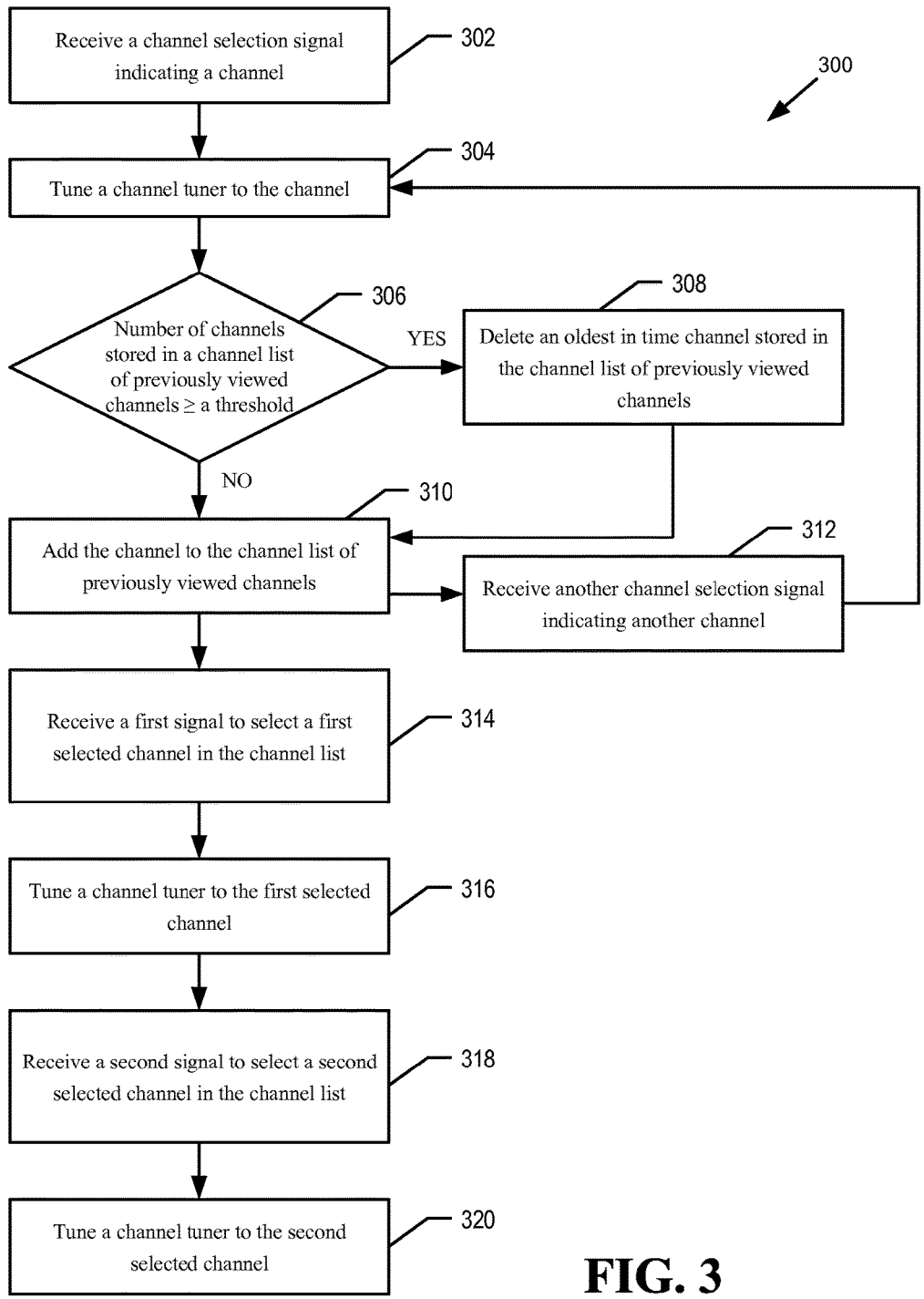
FIG. 3 is a flow chart of a particular illustrative embodiment of a method of navigating previously viewed channels.

Referring to FIG. 3, an illustrative embodiment of a method of navigating previously viewed channels is depicted and generally designated 300. Generally, the method 300 allows for a user to navigate a channel list containing multiple previously viewed channels. The method 300 includes receiving a channel selection signal indicating a channel, at 302. A channel tuner can then be tuned to the channel, at 304. A determination can then be made to determine if a number of channels stored in the channel list is greater than or equal to a threshold, at 306. In a particular embodiment, the threshold may be user selectable. The channel list may be stored in a memory of a user device or a remote control, such as the user device 102 or the remote control device 120 shown in FIG. 1.

When the number of channels stored in the channel list is greater than or equal to the threshold, an oldest in time channel stored in the channel list can be deleted, at 308. After the oldest channel has been deleted or when the number of channels in the channel list is less than the threshold, the recently tuned channel can be added to the channel list, at 310. In a particular embodiment, the multiple previously viewed channels in the channel list may be stored in an order in which they were viewed with respect to time. In a particular embodiment, the multiple previously viewed channels may be stored in the channel list after the occurrence of an event. The event may include a power on event, a reset event, or a timer expire event. In a particular embodiment, a channel may only be added to the channel list after the channel has been viewed after the event.

Another channel selection signal indicating a second channel may be received, at 312. The method 300 then repeats the tuning at 304, the determining at 306, the adding at 310, and, if necessary, the deleting at 308. Additionally, yet another channel selection signal indicating a third channel may be received, at 312. The method 300 then repeats the tuning at 304, the determining at 306, the adding at 310, and, if necessary, the deleting at 308. These parts of the method 300 may be repeated for every channel selection signal received by a user device implementing the method 300.

Alternatively, a first signal to select a first selected channel in the channel list may be received, at 314. The channel tuner may then be tuned to the first selected channel, at 316.

In a particular embodiment, a second signal to select a second selected channel in the channel list, where the second selected channel is a different channel than the first selected channel, may be received, at 318. In a particular embodiment, the second selected channel is a channel in the channel list that immediately precedes the first selected channel. In another particular embodiment, the second selected channel is a channel in the channel list that immediately succeeds the first selected channel. The channel tuner may then be tuned to the second selected channel, at 320.

In a particular embodiment, the user may navigate to a previous channel from the channel list by depressing a previous channel selection key on a remote control, such as the previous channel selection key 122 shown in FIG. 1. The user may also navigate to a second previous channel by depressing the previous channel selection key twice. In another particular embodiment, the user may navigate to a next channel in the channel list by depressing a next channel selection key on the remote control, such as the next channel selection key 124 shown in FIG. 1. The user may also navigate to another next channel in the channel list by depressing the next channel selection key twice. The user may navigate backwards or forwards in the channel list by pressing either the previous channel selection key or the next channel selection key once or multiple times depending on the desired previous channel and a respective channel location in the channel list.

In a particular embodiment, the channel list may be sent to a display device to display the channel list. The user may navigate to a channel in the channel list by selecting at least one selectable element displayed on a display device, where each user selectable element corresponds to a specific channel in the channel list. The user may select the user selectable elements using a remote control device or other user input controls located on the user device. In another particular embodiment, the user may select a channel in the channel list by navigating a selection mechanism, such as a highlight mechanism, on a display until the desired channel is selected, and confirming the selection.

In another illustrative embodiment, the user may select the desired channel by entering a value on a keypad of a remote control device. For example, once the channel list is displayed on a display device, the user may press a first selection key, such as a selection key labeled "1", to select a first channel shown in the channel list. Further, the user may select a second channel shown in the channel list by depressing a second selection key, such as a selection key labeled "2". Even further, the user may select a third channel shown in the channel list by depressing a third selection key, such as a selection key labeled "3". In a particular embodiment, each channel in the channel list can be associated with a specific selection key, or combination of selection keys, on a remote control to allow a user to select a respective channel.

Figure 4:
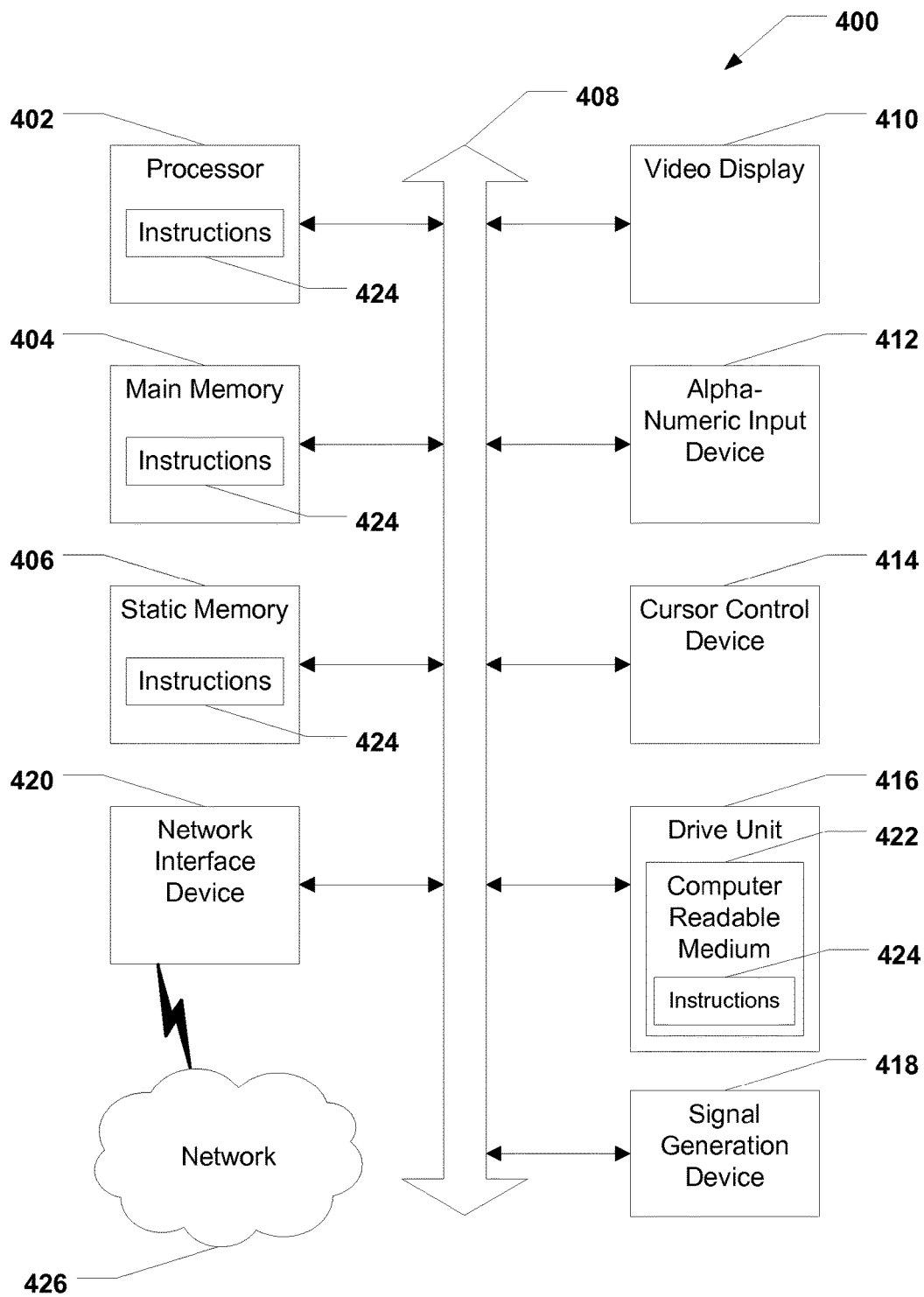
FIG. 4 is a block diagram of a particular illustrative embodiment of a general computing system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, from a first device at a second device, first input corresponding to a first selection of a previous channel option, the first input indicating a request to view a list, wherein the list includes multiple elements, each of the elements corresponding to respective video content;

sending list data corresponding to the list to the first device in response to the request, wherein the elements of the list are ordered based on a display order in which the respective video content was displayed prior to receiving the first input;

receiving, at the second device, second input corresponding to a second selection of the previous channel option; and navigating within the list based on the second input.

2. The method of claim 1, wherein the display order corresponds to an order that the respective video content was displayed on a third device distinct from the first device.

3. The method of claim 1, wherein the elements of the list are ordered from most recently displayed to least recently displayed, or from least recently displayed to most recently displayed.

4. The method of claim 1, wherein a number of elements included in the list is less than or equal to a threshold number of elements.

5. The method of claim 4, further comprising, responsive to the list including the threshold number of elements, removing an oldest element corresponding to a least recently displayed video content item from the list and adding a new element corresponding to a most recently displayed video content item to the list.

6. The method of claim 4, wherein the threshold number of elements is user defined.

7. The method of claim 1, wherein each of the elements includes an identifier associated with the respective video content.

8. The method of claim 1, wherein the list is displayed concurrently with particular video content corresponding to a particular element included in the list.

9. The method of claim 8, further comprising receiving the particular video content via a network.

10. A device comprising:
a processor; and
a memory storing instructions that, when executed by the processor, cause the processor to perform operations comprising:
receiving, from a first device, first input corresponding to a first selection of a previous channel option, the first input indicating a request to view a list, wherein the list includes multiple elements, each of the elements corresponding to respective video content;
sending list data corresponding to the list to the first device in response to the request, wherein the elements of the list are ordered based on a display order in which the respective video content was displayed prior to receiving the first input;
receiving second input corresponding to a second selection of the previous channel option; and
navigating within the list based on the second input.

11. The device of claim 10, wherein the operations further comprise:
receiving third input indicating selection of a number; and
selecting a particular element of the list based on the number and based on a position of the particular element in the list.

12. The device of claim 10, wherein the processor and the memory, are included in a desktop computer or a laptop computer.

13. The device of claim 10, wherein the processor and the memory are included in a set-top box.

14. The device of claim 10, wherein the processor and the memory are included in a game console.

15. The device of claim 10, wherein the processor and the memory are included in a wireless electronic device.

16. The device of claim 10, wherein the operations further comprise sending particular video content corresponding to a particular element included in the list to a second device such that the list is displayed concurrently with the particular video content.

17. A computer-readable storage device storing instructions that, when executed by a processor, cause the processor to perform operations comprising:
receiving, from a first device, first input corresponding to a first selection of a previous channel option, the first input indicating a request to view a list, wherein the list includes multiple elements, each of the elements corresponding to respective video content;
sending list data corresponding to the list to the first device in response to the request, wherein the elements of the list are ordered based on a display order in which the respective video content was displayed prior to receiving the first input;
receiving second input corresponding to a second selection of the previous channel option; and
navigating within the list based on the second input.

18. The computer-readable storage device of claim 17, wherein the display order corresponds to an order that the respective video content was displayed on a third device distinct from the first device.

19. The computer-readable storage device of claim 17, wherein the elements of the list are ordered from most recently displayed to least recently displayed, or from least recently displayed to most recently displayed.

20. The computer-readable storage device of claim 17, wherein the list is displayed concurrently with display of particular video content corresponding to a particular element included in the list.

* * * * *